United States Patent [19]

Caputo

[11] 4,307,793
[45] Dec. 29, 1981

[54] ELEVATOR SYSTEM

[75] Inventor: William R. Caputo, Wyckoff, N.J.

[73] Assignee: Westinghouse Electric Corp., Pittsburgh, Pa.

[21] Appl. No.: 108,263

[22] Filed: Dec. 28, 1979

[51] Int. Cl.³ .............................................. B66B 5/02
[52] U.S. Cl. .................................. 187/29 R; 318/506
[58] Field of Search ................. 187/29; 318/450, 453, 318/474, 506; 361/31, 63, 87, 100

[56] References Cited
U.S. PATENT DOCUMENTS

| | | | |
|---|---|---|---|
| 3,961,688 | 6/1976 | Maynard | 187/29 |
| 4,016,468 | 4/1977 | Graf | 318/506 X |
| 4,085,823 | 4/1978 | Caputo et al. | 187/29 |
| 4,155,427 | 5/1979 | Caputo et al. | 187/29 |
| 4,165,801 | 8/1979 | Watanabe et al. | 187/29 |

Primary Examiner—S. J. Witkowski
Assistant Examiner—W. E. Duncanson, Jr.
Attorney, Agent, or Firm—D. R. Lackey

[57] ABSTRACT

An elevator system of the traction type having a direct current drive motor and a solid-state, dual-bridge converter power supply. Protective and monitoring apparatus reduce the probability of fuse blowing due to improper gating of a controlled rectifier device, and/or a power supply interruption, while enabling the system to override longer power supply interruptions without initiating shutdown in certain instances. The deceleration range of the elevator car is narrowed, when an orderly shutdown is required, by sensing predetermined parameters of the elevator system and logically selecting the value of a dynamic braking resistance in response thereto.

10 Claims, 2 Drawing Figures

ELEVATOR SYSTEM

BACKGROUND OF THE INVENTION

1. Field of the Invention

The invention relates in general to elevator systems, and more specifically to traction elevator systems having a direct current drive motor and a solid-state, dual-bridge converter power supply.

2. Description of the Prior Art

Solid-state, dual-bridge converters, which utilize controlled rectifiers or thyristors to interchange electrical energy between alternating and direct current circuits, are being used to supply adjustable, reversible direct current voltage and currents for the direct current drive motor of traction elevator systems. While solid-state converters have many advantages over the conventional motor-generator set as the direct current voltage source, they are also more sensitive to momentary interruptions and abnormalities in the alternating current voltage source. Such interruptions and abnormalities may cause a power fuse to blow, resulting in the elevator car being out of service until maintenance personnel replace the fuse.

Fuse blowing may also result if the wrong thyristor is inadvertently gated, a thyristor fails to commutate, or if one bank of the converter is activated while current is still flowing in the other bank.

To minimize fuse blowing, the prior art attempts to recognize those conditions which may result in fuse blowing, and upon detecting such a condition an orderly shutdown of the elevator system is initiated, such as by driving the active converter or bank into inversion end stop, suppressing gate drive, and causing the associated elevator car to make an emergency stop. The prior art arrangements still result in a certain amount of fuse blowing, and also in shutdowns to prevent fuse blowing which are actually unnecessary.

The prior art emergency stop arrangement drops the electromechanical brake, disconnects the motor armature from the direct current voltage source, and connects a dynamic braking resistor across the armature. The dynamic braking resistor is sized to prevent cable slippage on the drive sheave when the elevator car is moving downwardly at rated speed with rated load. If an emergency stop is made while the elevator car is moving upwardly at rated speed with rated load, the deceleration rate will be appreciably higher than for the downward travel direction. The relatively high deceleration rate may be reduced by reducing the dynamic braking force, i.e., by increasing the value of the dynamic braking resistor, but the deceleration rate for the fully loaded, downwardly moving elevator car will then be too low.

Thus, it would be desirable to more accurately discriminate between conditions where an emergency stop of the elevator car is actually required, and when it is not, in order to prevent unnecessary shutdowns. It would also be desirable to minimize fuse blowing due to inadvertent gating of the wrong thyristor, or activation of one converter bank while current is still flowing in the other bank. Finally, it would be desirable to reduce the deceleration range of the elevator car when an emergency stop is required.

SUMMARY OF THE INVENTION

Briefly, the present invention is a new and improved elevator system of the traction type having a direct current drive motor supplied with variable, reversible direct current and voltage from a dual-bridge converter. The DC armature current and AC line currents are all monitored to develop inhibit signals which prevent one bank from being activated while current is still flowing in the other bank, and to prevent the firing of any controlled rectifier device of the active bank which would result in fuse blowing. The response time in initiating an orderly shutdown of the elevator system following a power supply interruption is made responsive to whether the direct current drive motor is motoring or regenerating at the time of the power supply interruption. It has been found that longer interruptions may be overridden when motoring, than when regenerating, with this adjustable response to power supply interruption preventing many unnecessary shutdowns. The value of the dynamic braking resistance connected across the armature of the direct current drive motor in response to orderly shutdown of the elevator system initiated in response to an abnormal condition such as a power supply interruption, is selected in response to the elevator car load and travel direction. Selecting the value of the dynamic braking resistance in response to car load and travel direction results in a much narrower range in the deceleration rate of the elevator car, for all conditions of carloading and travel direction.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF PREFERRED EMBODIMENT

Figure 1A:
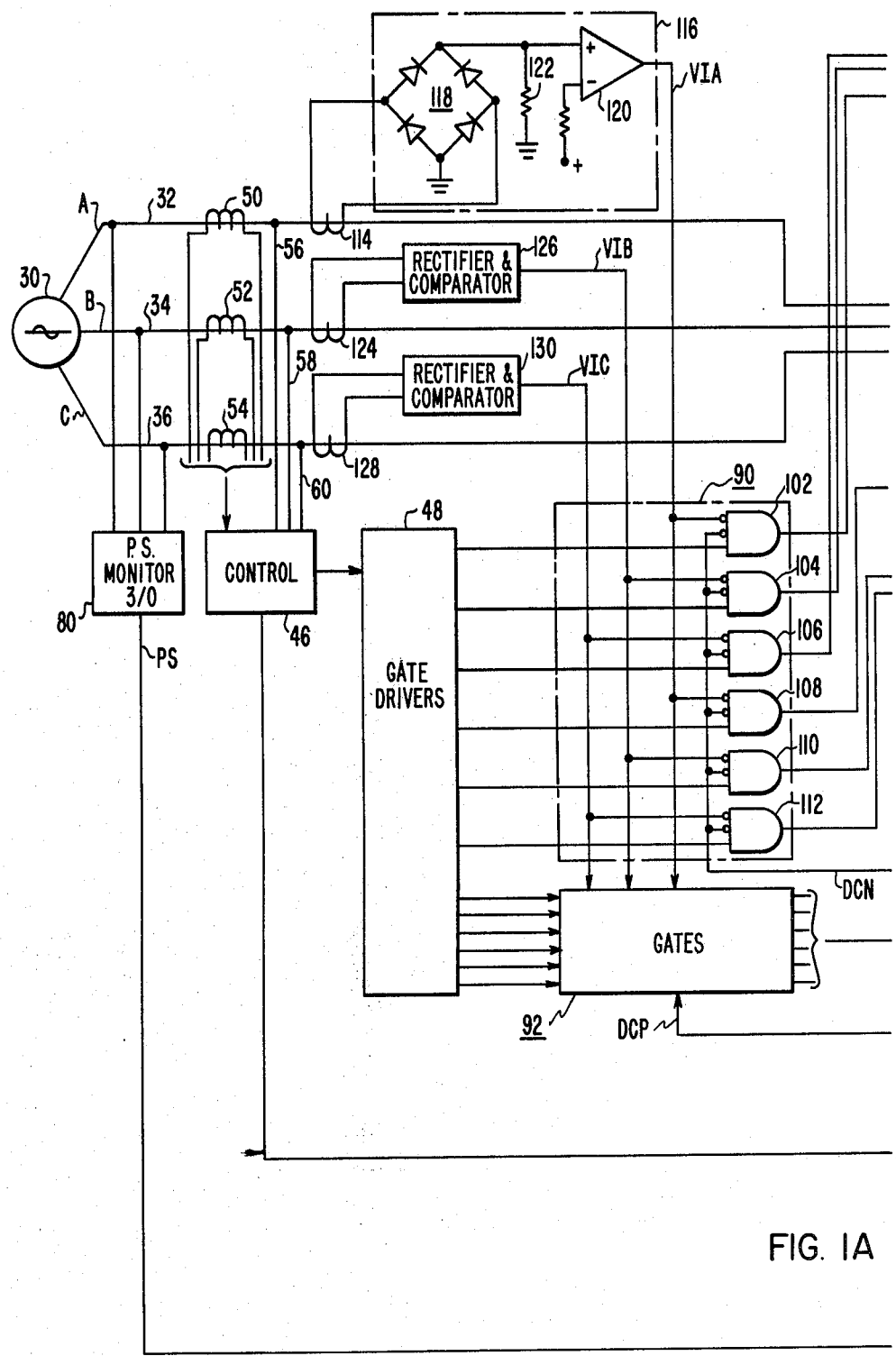
FIGS. 1A and 1B may be assembled to provide a schematic diagram of an elevator system constructed according to the teachings of the invention.
Figure 1B:
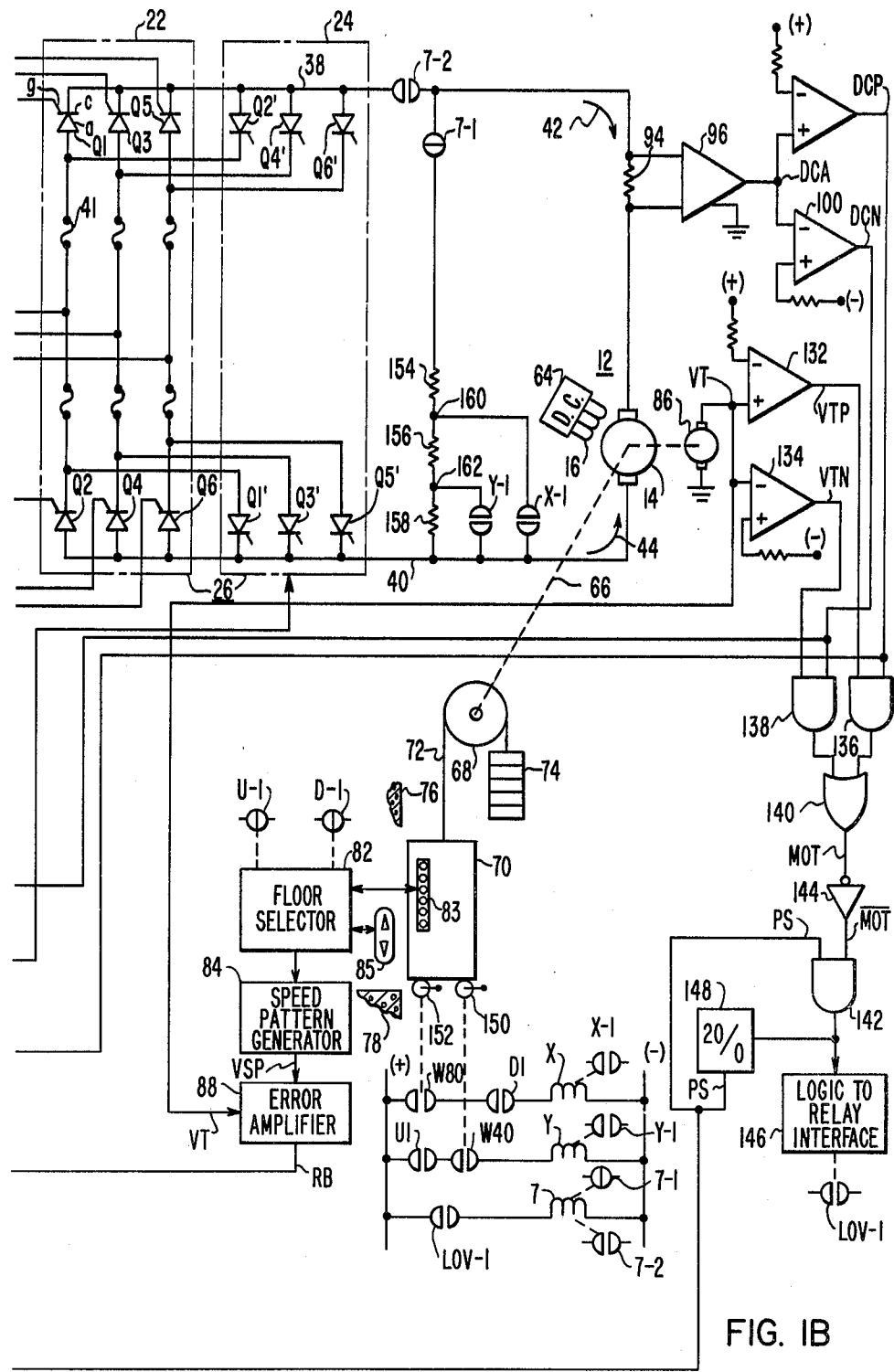

Referring now to the drawings, FIGS. 1A and 1B collectively illustrate an elevator system 10 constructed according to the teachings of the invention. Elevator system 10 is of the electric traction type, which includes a direct current drive motor 12 having an armature 14 and a field winding 16. The direct current drive motor 12 is supplied from a solid-state controlled rectifier dual-bridge converter connected to a three-phase source of electrical potential. The dual-bridge converter is an adjustable, reversible, static source of direct current potential which includes first and second converter banks 22 and 24, respectively, referred to collectively as a dual converter 26. Each of the converter banks 22 and 24 of the dual converter 26 is a three-phase, full-wave bridge circuit, which includes a plurality of controlled rectifier devices or thyristors Q1 through Q6 in bank 22, and Q1' through Q6' in bank 24, with each controlled rectifier device having anode, cathode and gate electrodes a, c and g, respectively, connected to interchange electrical power between alternating and direct current circuits. The alternating current circuit includes a source 30 of alternating potential, such as a three-phase, 60 Hz supply, and electrical lines or buses 32, 34 and 36 connected to the A, B and C phases, respectively, of source 30 via a suitable circuit breaker (not shown).

The direct current circuit includes buses 38 and 40 to which the first and second converter banks 22 and 24 are connected. The two converter banks 22 and 24 are connected in parallel opposition between buses 38 and 40, and buses 38 and 40 are connected to the armature 14 of the drive motor 12 via contacts 7-2 of a suitable circuit breaker or contactor 7, which, along with contacts 7-1, initiate dynamic braking of the drive motor 12, as will be hereinafter explained. It will be noted that the controlled rectifier devices of the two converter banks are connected into six inverse parallel connected pairs. Each such pair is fused, such as fuse 41 connected in series with pair Q1–Q2'.

The dual bridge converter 26 controls the magnitude of the direct current voltage applied to armature 14, by controlling the conduction or firing angle of the controlled rectifier devices, and it controls the direction of the direct current flow through the armature 14 by selectively operating the converter banks. The two converter banks should not be activated simultaneously, as this would create a short circuit condition, blowing the fuses.

When converter bank 22 is operational, current flow is indicated by arrow 42, proceeding through the armature 14 from bus 38 to bus 40. When converter bank 24 is operational, current flow is indicated by arrow 44, proceeding from bus 42 to bus 38. Thus, the direction of torque produced by armature 14 depends upon which of the two converter banks is operational, and the speed of rotation of the drive motor depends upon the firing angle of the controlled rectifiers. U.S. Pat. Nos. 3,713,011 and 3,713,012 illustrate dual converter apparatus suitable for an elevator application. U.S. Pat. No. 3,749,204 illustrates a servo control loop which may be used. U.S. Pat. No. 3,741,348 illustrates in detail elevator control which may be modified to stop the elevator car according to the teaching of the invention. These U.S. Patents, which are assigned to the same assignee as the present application, are hereby incorporated by reference and it is thus sufficient to indicate the control generally at 46, and the gate drivers which are responsive to control 46, at 48. Control 46 receives information relative to the operation of dual converter 26 via current transformers 50, 52 and 54, and via conductors 56, 58 and 60 which are connected to buses 32, 34 and 36, respectively.

The field winding 16 of drive motor 12 is connected to a suitable source 64 of direct current voltage, such as a single bridge converter.

Drive motor 12 includes a drive shaft 66, to which a traction sheave 68 is secured. An elevator car 70 is supported by steel ropes 72 which are reeved over the sheave 68 and connected to a counterweight 74. The elevator car 70 is disposed in a hoistway 76 of an associated building or structure for guided vertical movement therein to serve a plurality of floors, such as the floor indicated generally at 78.

The dual converter 26 has many advantages over the motor-generator set in providing an adjustable direct current voltage for the elevator drive machine, but it is more subject to unnecessary shutdowns, misfiring and blown fuses. A power supply monitor 80 detects abnormalities in the power supply, and it provides an appropriate signal PS when it detects a situation which may require shutdown of the elevator system. A power supply monitor which may be used for monitor 80 is disclosed in U.S. Pat. No. 4,155,427, which is assigned to the same assignee as the present application. The monitor disclosed in this patent is especially suitable for elevator systems in which a dual converter 26 supplies a controllable DC voltage from a three-phase source. It monitors the power supply, ignoring harmless distortion and commutation notches while initiating a signal which may be used to shut down the elevator system and inhibit the gate firing signals, upon single phasing of the three-phase source, and upon an interruption in the power supply which persists for a predetermined period of time. Ten milliseconds was used in the patent for purposes of example, as a good compromise between motoring and regenerating conditions. Following an interruption in the power supply of this predetermined period of time, the power supply must then return to normal for a longer predetermined period of time, such as 10 seconds, during which no interruptions are detected which are as long as the shorter predetermined period of time, before the elevator car is allowed to restart. As will be hereinafter described in detail, the predetermined period of time may be much shorter than 10 milliseconds, such as 3 milliseconds, by distinguishing between motoring and regenerating conditions. If the drive motor is regenerating at the time of the 3 millisecond interruption in the power supply, the output of the power supply monitor is used to initiate an emergency stop, as fuse blowing may occur very quickly following a power supply interruption when the drive motor is regenerating. If the drive motor is motoring at the time of the power supply interruption, the 3 millisecond signal is used to start a timer which is set to time out after a period of time longer than 10 milliseconds, such as 20 milliseconds, if the power supply interruption exists for this length of time. Fuse blowing does not occur as quickly following a power supply interruption, when the drive motor is motoring. Thus, a power supply interruption of less than 23 milliseconds, for example, will not cause an unnecessary shutdown when the elevator drive motor is motoring, and yet shutdown occurs after a power supply interruption of only 3 milliseconds, when the drive motor is regenerating.

The movement mode of the elevator car 70 and its position in hoistway 76 are controlled by a floor selector 82 which, in response to car and hall calls, such as initiated by car call and hall call push buttons 83 and 85, respectively, selects the polarity of the voltage applied to the armature 14 and the drive motor 12. The magnitude of the direct current voltage applied to armature 14 is responsive to a velocity command signal VSP provided by a suitable speed pattern generator 84. The speed pattern generator 84 provides its speed pattern VSP in response to a signal from the floor selector 82. A suitable floor selector and a suitable speed pattern generator are shown in U.S. Pat. No. 3,750,850, which is assigned to the same assignee as the present application.

A suitable control loop for controlling the speed, and thus the position of the elevator car 70 in response to the velocity command signals VSP includes a tachogenerator 86 which provides a direct current voltage signal VT having a magnitude responsive to the actual speed of the elevator car, and a polarity responsive to car travel direction. The speed pattern signal VSP is compared with the actual speed signal VT from generator 86 in an error amplifier 88, and the output signal RB is compared with the actual current flowing in the operational converter bank via a current comparison circuit in control 46. Suitable compensation for the error signal is disclosed in U.S. Pat. No. 4,030,570, which is assigned to the same assignee as the present application.

The dual converter 26 is operated in a closed current loop mode, using current feedback to operate the converter essentially as a current amplifier. The current comparison circuit may be the same as set forth in the hereinbefore referred to U.S. Pat. No. 3,713,011.

The probability of gating the wrong controlled rectifier device, or activating one converter bank before current ceases in the other bank, is greatly reduced according to the teachings of the invention by developing certain gating inhibit signals for the controlled rectifier devices directly from the direct current flowing in the armature 14, and directly from the alternating line currents flowing in lines 32, 34 and 36. It has been found that during certain abnormal conditions, it is possible to have current flowing in a converter bridge and no current flowing in any of the AC lines. If controlled rectifiers are then gated in the inactive bridge, a line-to-line short will be created blowing the fuses. Thus, indirectly sensing armature current by sensing AC line currents will not provide adequate bank interlock protection. Thus, the present invention utilizes the direct detection of DC armature current in combination with direct detection of AC line currents, to provide an inhibit arrangement which greatly reduces the probability of fuse blowing.

More specifically, the present invention provides additional controlled gates through which the gating signals from the gate drivers 48 must pass before being applied to each converter bank, such as gates 90 for bank 22 and gates 92 for bank 24. These additional controllable gates are selectively inhibited by AC- and DC-derived logic signals.

A suitable DC current transducer arrangement for providing logic signals responsive to the magnitude and direction of the direct current flowing in the armature 14 of the drive motor 12 may be provided by an impedance device, such as resistor 94, and isolation amplifier 96, and comparators 98 and 100. Resistor 94 is connected in series with armature 14, and isolation amplifier 96 provides an analog signal DCA having a magnitude responsive to the voltage drop across resistor 94, and a polarity responsive to the direction of current flow. Comparators 98 and 100 may be operational amplifiers (op amps), having their non-inverting and inverting inputs respectively connected to receive analog signal DCA. A small positive reference voltage is applied to the inverting input of comparator 98, and a small negative reference voltage is applied to the non-inverting input of comparator 100. When the current flowing in armature 14 is insufficient to exceed the small thresholds provided by the reference voltages, the outputs of both comparators 98 and 100 will be at the logic zero level. If the armature current exceeds the threshold value and is in the direction of arrow 42, signal DCA will be more positive than the reference voltage applied to comparator 98, and comparator 98 will output a logic one signal, referred to as signal DCP. This same signal applied to comparator 100 causes comparator 100 to output a logic zero signal, referred to as signal DCN. On the other hand, when the current flow in the armature circuit is above the threshold value and in the direction of arrow 44, signal DCA will be negative, signal DCP will be a logic zero, and signal DCN will be a logic one. As illustrated, signal DCN is applied to an input of each of the gates 90 associated with bank 22, and signal DCP is applied to an input of each of the gates 92 associated with bank 24. Since gates 90 and 92 may be of like construction, only gates 90 are illustrated in detail. Gates 90 may include six three-input AND gates 102, 104, 106, 108, 110 and 112, with each gate having two inhibit inputs, which require logic zero signals to allow a logic one signal applied to the remaining input from the gate drivers 48 to appear at the output of the gate. Thus, when bank 22 is operational and current is flowing in the direction of arrow 42, signal DCN will be a logic zero, enabling the associated inhibit inputs of gates 90, and signal DCP, which will be a logic one, will disable all of the gates 92. Thus, as long as there is current flow in armature 14 in a direction which indicates bank 22 is operational, bank 24 cannot be activated, even when all of the AC line currents are zero.

The remaining inhibit input of each of the gates in gates 90 and 92 is controlled by a logic signal derived from the AC line currents. Only two of the three AC lines carry current at any instant, excluding the controlled rectifier device commutation period. For example, a logic signal VIA responsive to AC current flow in line 32 may be provided by a current transformer 114, and a rectifier/comparator arrangement 116. The rectifier/comparator arrangement 116 may include a single-phase, full-wave bridge rectifier 118 and an op amp comparator 120. The positive output terminal of bridge 118 is applied to the non-inverting input of comparator 120, and a small positive reference voltage is applied to its inverting input. When there is no current flowing in line 32, or it is so small that it provides a DC voltage across burden resistor 122 which is less than the threshold provided by the reference voltage, the signal VIA will be a logic zero. When current flows in line 32, signal VIA will switch to the logic one level. In like manner, a logic signal VIB responsive to current flow in line 34 is provided by current transformer 124 and rectifier/comparator arrangement 126, and a logic signal VIC responsive to current flow in line 36 is provided by current transformer 128 and rectifier/comparator arrangement 130.

Logic signals VIA, VIB and VIC are each connected to enable two predetermined controlled rectifier devices in each bridge when there is no current flowing in its associated line, and to inhibit the same two controlled rectifier devices when current flow in its associated line is detected. For example, if current is flowing through controlled rectifier devices Q3 and Q6, logic signal VIB will be a logic one, which inhibits gate 110 and thus prevents Q4 from firing, and logic signal VIC will be a logic one which inhibits gate 106 and prevents device Q5 from firing. Thus, line-to-line short circuits, and shorting the armature if regenerating, are prevented. On the other hand, logic signal VIA will be a logic zero, enabling the gating of either device Q1 or Q2. As soon as device Q1 or Q2 is gated, logic signal VIA will then go to a logic one, inhibiting the other device from being gated.

As hereinbefore mentioned, the elevator system 10 has an adjustable response to power supply interruptions, depending upon whether the drive motor 12 is motoring or regenerating at the time of the power supply interruption. The elevator drive motor 12 is motoring when it is driving the elevator car downwardly and the weight of the elevator car and its load is less than the weight of the counterweight, or when the drive motor is driving the elevator car upwardly when the elevator car and its load exceeds the weight of the counterweight. The elevator drive motor 12 is regenerating when it is holding the elevator car back while lowering it when the elevator car and its load exceeds the weight of the counterweight, or when it is holding the counterweight back when the elevator car is being lifted when the elevator car and its load is less than the weight of the counterweight. This adjustable response is accomplished by developing an additional pair of logic signals VTP and VTN responsive to the counter EMF of the drive motor 12. The tachogenerator 86 is coupled directly to drive motor 12, and thus its voltage VT is proportional to the counter EMF of the drive motor 12. Voltage VT is applied to comparators 132 and 134, which may be op amps, with the voltage output VT from the tachogenerator 86 being applied to the non-inverting input of op amp 132, and to the inverting input of op amp 134. Small positive and negative reference voltages are applied to the inverting and non-inverting inputs of op amps 132 and 134, respectively, to provide thresholds. When the drive motor 12 is rotating in a direction corresponding to its direction when motoring in response to current in the direction of arrow 42, the output voltage VT will be positive, signal VTP will be a logic one, and signal VTN will be a logic zero. When drive motor 12 is rotating in a direction corresponding to its direction when motoring in respose to current in the direction of arrow 44, output voltage VT will be negative, signal VTP will be a logic zero, and signal VTN will be a logic one.

When the elevator drive motor 12 is motoring in response to bank 22 and current in the direction of arrow 42, signals DCP and VTP will both be at the logic one level, and signals DCN and VTN will both be at the logic zero level. When the drive motor 12 is motoring in response to bank 24 and current in the direction of arrow 44, signals DCP and VTP will both be at the logic zero level, and signals DCN and VTN will both be at the logic one level. When the elevator drive motor 12 is regenerating, the opposite bank will be providing current for a given rotational direction of the drive motor 12, and thus logic signals VTP and DCP will be unlike, and logic signals DCN and VTN will be unlike. A logic signal MOT may be developed which is at the logic one level when drive motor 12 is motoring, and at the logic zero level when it is regenerating, by a pair of dual input AND gates 136 and 138, and an OR gate 140. Logic signals DCP and VTP are applied to the inputs of AND gate 136, and logic signals DCN and VTN are applied to the inputs of AND gate 138. The outputs of AND gates 136 and 138 are applied to the input of OR gate 140. When drive motor 12 is motoring, one of the AND gates will have two logic one input signals, applying a logic one signal to OR gate 140, which in turn outputs signal MOT at the logic one level. When drive motor 12 is regenerating, AND gates 136 and 138 will both output logic zero signals to OR gate 140, and signal MOT will be at the logic zero level.

Power supply monitor 80 may be set to provide an output signal PS which is true or at the logic one level after an interruption in the power supply 30 of a very short time, i.e., 3 milliseconds, for example. Logic signal PS is applied to one input of a dual input AND gate 142, and logic signal MOT is applied to the other input via an inverter gate 144. The output of AND gate 142 is applied to a suitable logic-to-relay interface 146, which, when the output of AND gate 142 goes high, causes a relay LOV to drop and open a contact LOV-1. Relay LOV, when deenergized, initiates an orderly shutdown of the elevator system. Contact LOV-1 is connected to control contactor 7, with contact LOV-1, when it opens, initiating dynamic braking of the drive motor 12.

If drive motor 12 is regenerating when an interruption in the power supply of 3 milliseconds occurs, signal MOT will be low and signal MOT will be high, signal PS will be high, and AND gate 142 applies a logic one to interface 146 to initiate an orderly shutdown of the elevator system. If the drive motor is motoring at the time of the 3 millisecond interruption in the power supply, the drive motor 12 will override a longer power supply interruption before there is danger of fuse blowing. Thus, the high signal MOT signifying motoring is inverted to a logic zero by gate 144 and the AND gate 142 is blocked. Thus, the 3 millisecond signal from the power supply monitor 80 is prevented from initiating an orderly shutdown, in this instance.

The monitor signal PS is also applied to a timer 148. Timer 148 is set to time out and switch its output from a logic zero to a logic one after a pre-set time, if its input is held at the logic one level for this time period, such as 20 milliseconds, for example. If signal PS does not stay high for 20 milliseconds, timer 148 automatically resets. Thus, it requires an interruption in the power supply of 23 milliseconds, in the example, for the output of timer 148 to go to the logic one level. The switching of the output of timer 148 from its logic zero to the logic one level is used to initiate an orderly shutdown of the elevator system, as hereinbefore described relative to the output of AND gate 142. When the relay LOV drops to initiate an orderly shutdown of the elevator system, a contact of relay LOV in the power supply monitor 80 may be used to cause the power supply monitor to go into its operating mode wherein it requires that the power supply 30 return to normal for a much longer period of time, such as 10 seconds, before allowing its output signal PS to return to the logic zero level. Return of signal PS to the logic zero level, may be used to restart the elevator system.

As hereinbefore stated, contact LOV-1 of relay LOV is connected to the electromagnetic coil 7 of the dynamic braking contactor, which has a n.c. contact 7-1 and a n.o. contact 7-2. Contact 7-2 connects converter 26 to drive motor 12 when contact 7 is energized, and contact 7-1 opens to disable a dynamic braking circuit across armature 14. When an orderly shutdown of the elevator system is initiated by contact LOV-1 opening to drop contactor 7, converter 26 is disconnected from the drive motor 12 via the now open contact 7-2, and contact 7-1 closes to automatically connect the dynamic braking circuit across armature 14.

In accordance with the teachings of the invention, the value of the dynamic braking resistance connected in the circuit of contact 7-1, and thus the dynamic braking force, is adjusted to narrow the resulting deceleration range of the elevator car, compared with the range which would result from using a fixed value for the dynamic braking resistor. The value of the dynamic braking resistance is selected in response to car load and car travel direction. Travel direction logic signals DGU and DGD, which are developed in the floor selector 82 as disclosed in the hereinbefore mentioned U.S. Pat. No. 3,750,850 may be used to control the condition of contacts U-1 and D-1 via suitable logic-to-relay interfaces. Contact U-1 will be closed when the elevator car is set to travel in the up-travel direction, and open when the elevator car is set to travel in the down-travel direction. Contact D-1 will be open when the elevator car is set to travel in the up direction, and closed when the elevator car is set to travel in the down direction.

Car loading may be detected via suitable floor switches 150 and 152 in the elevator car 70, with switches 150 and 152 controlling the conditions of contacts W-40 and W-80, respectively. When the car load is below a first predetermined value, such as 40% of rated load, for example, contact W-40 will be closed and contact W-80 will be open. When the elevator car is above the first predetermined load, but below a second predetermined load, such as 80% of rated load, contact W-40 will be open and contact W-80 will be open. When the car load exceeds this second predetermined value, contact W-40 will be open and contact W-80 will be closed.

Contacts W-80 and D-1 are connected in series with the electromagnetic coil of a relay X having a n.o. contact X-1, and contacts W-40 and U-1 are connected in series with the electromagnetic coil of a relay Y having a n.o. contact Y-1. Contacts X-1 and Y-1 are connected in the dynamic braking circuit which includes contact 7-1 and resistors 154, 156 and 158. Contact 7-1 and resistors 154, 156 and 158 are serially connected from bus 38 to bus 40. Resistors 154 and 156 may each have a value of 1 ohm and resistor 158 may have a value of 2 ohms, for example. Contact X-1 is connected from the junction 160 between resistors 154 and 156 to bus 40, and contact Y-1 is connected from the junction 162 between resistors 156 and 158 to bus 40. Thus, when the elevator car 70 is traveling upwardly at less than 40% load, relay Y will be energized, relay X will be deenergized, and resistors 154 and 156 will be in the dynamic braking circuit, providing a dynamic braking resistance of 2 ohms. When the elevator car is traveling upwardly, with more than 40% load, both relays X and Y will be deenergized and all of the resistance will be in the dynamic braking circuit, providing a dynamic braking resistance of 4 ohms, which will provide a lower dynamic braking effort than 2 ohms. When the elevator car is traveling downwardly with less than 80% load, both relays X and Y will be deenergized, providing 4 ohms of dynamic braking resistance. When the elevator car is traveling downwardly with a load exceeding 80%, relay X will be energized and only resistance 154 will be in the dynamic braking circuit, providing a relatively high dynamic braking effort, as only 1 ohm of resistance will be in the circuit. Thus, the deceleration range is substantially narrowed, compared with the range when a fixed value of dynamic braking resistance is used, as the dynamic braking effort is adjusted according to car-load and car-travel direction, as required, to achieve the desired narrow deceleration range.

In summary, there has been disclosed a new and improved elevator system 10 of the traction type, which has a direct current drive motor connected to be supplied from a solid-state, dual-bridge converter. Suitable gating inhibit signals are developed directly from the DC current flowing in the armature circuit, and directly from the AC line currents, which interlock the two banks, precluding one bank from being activated while current is flowing in the armature circuit from the other bank, and inhibiting controlled rectifier devices in the operational bank from being gated if such gating would result in a short circuit. Unnecessary shutdowns of the elevator system are reduced, in response to interruptions in the power supply, by making the response time responsive to whether the elevator drive motor is motoring or regenerating at the time of the power supply interruption. It has been found that fuse blowing occurs very quickly after a power supply interruption when the drive motor is regenerating, and thus the elevator system is shut down very quickly following such an interruption if the drive motor is in the regenerating condition. On the other hand, the elevator system will override relatively long power supply interruptions, without fuse blowing, if the drive motor is motoring at the time of the interruption. Thus, the response time to a power supply interruption is made much longer, before an orderly shutdown is initiated, if the drive motor is motoring at the time of the interruption. Finally, the deceleration range of the elevator car is greatly narrowed, according to the teachings of the invention, when an orderly shutdown is initiated, by selectively adjusting the value of the dynamic braking resistance which is connected across the armature of the direct current drive motor at the time of the shutdown.

I claim:

1. An elevator system, comprising:
   an elevator car mounted for up and down travel in a guided path,
   motive means including a direct current motor having an armature for driving said elevator car in its guided path,
   power supply means for said direct current motor including a three-phase source of alternating potential, and first and second converter banks each having a plurality of controlled rectifier devices connected to interchange electrical power between AC and DC circuits,
   said first and second converter banks each having AC input terminals connected to said three-phase source of alternating potential to provide the AC circuit, and DC output terminals connected to the armature of said direct current motor to provide the DC circuit, with said first and second converter banks, when selectively activated, causing direct current flow in opposite directions through the DC circuit,
   control means including gate drive means for activating a selected one of said first and second converter banks by providing gating signals for selected ones of said controlled rectifier devices of the selected bank in a predetermined pattern,
   and protective means providing inhibit signals for said gate drive means in response to current flow in both said AC and DC circuits.

2. The elevator system of claim 1 wherein the protective means includes DC current transducer means in the DC circuit for providing first inhibit signals indicative of the presence of and the direction of current flow in the DC circuit, with said first inhibit signals interlocking said first and second converter banks by inhibiting gate drive signals from being applied to one of said converter banks while the direction of current flow in the DC circuit indicates the other of said converter banks is active.

3. The elevator system of claim 1 wherein the AC circuit includes three lines, with only two of the three lines carrying AC current at any instant, excluding the controlled rectifier device commutation period, and wherein the protective means includes AC current transducer means in each of said three lines for providing second inhibit signals indicative of which of the three lines has current flow at any instant, with said second inhibit signals preventing line-to-line short circuits, and shorting of the armature when regenerating, by inhibiting gate drive signals from being applied to those controlled rectifier devices of the active bank which current flow in the AC circuit indicates would result in shorting a phase of the three-phase source of alternating potential.

4. The elevator system of claim 2 including means providing polarity signals indicative of the polarity of the counter EMF of the direct current motor, means logically combining said polarity signals and the first inhibit signals to provide a load signal indicative of whether the direct current motor is motoring or regenerating, means responsive to said load signal and to the three-phase source of alternating potential for providing a loss-of-voltage signal indicative of an interruption in the three-phase source, with the time length of the interruption required to initiate said loss-of-voltage signal being responsive to whether the direct current motor is motoring or regenerating at the time of the interruption, and means responsive to said loss-of-voltage signal for modifying the operation of the elevator system.

5. The elevator system of claim 4 wherein the time length of the interruption in the three-phase supply which will initiate the loss-of-voltage signal is longer when the direct current motor is motoring than when it is regenerating.

6. The elevator system of claim 4 wherein the means which modifies the operation of the elevator system in response to the loss-of-voltage signal includes means connecting resistance means having a predetermined value across the armature of the direct current motor, and means disconnecting the power supply means from the direct current motor, to decelerate the elevator car to a stop.

7. The elevator system of claim 6 including means providing travel direction signals indicative of the travel direction of the elevator car, and means providing weight signals indicative of the load in the elevator car, and means responsive to said travel direction signals and to said weight signals for selecting a value for the resistance means which will decelerate the elevator car within a narrower range of deceleration limits than would be achievable using resistance means having a fixed value regardless of load and travel direction.

8. An elevator system, comprising:
an elevator car mounted for up and down travel in a guided path,
motive means including a direct current motor having an armature for driving said elevator car in its guided path,
power supply means for said direct current motor including a three-phase source of alternating potential, and first and second converter banks each having a plurality of controlled rectifier devices connected to interchange electrical power between AC and DC circuits,
said first and second converter banks each having AC input terminals connected to said three-phase source of alternating potential to provide the AC circuit, and DC output terminals connected to the armature of said direct current motor to provide the DC circuit, with said first and second converter banks, when selectively activated, causing direct current flow in opposite directions through the DC circuit,
control means including gate drive means for activating a selected one of said first and second converter banks by providing gating signals for selected ones of said controlled rectifier devices of the selected bank in a predetermined pattern,
means providing current direction signals indicative of the direction of current flow in the DC circuit,
means providing polarity signals indicative of the polarity of the counter EMF of the direct current motor,
means logically combining said polarity signals and the current direction signals to provide a load signal indicative of whether the direct current motor is motoring, or regenerating,
means responsive to said load signal and to the three-phase source of alternating potential for providing a loss-of-voltage signal indicative of an interruption in the three-phase source, with the time length of the interruption required to initiate said loss-of-voltage signal being responsive to whether the direct current motor is motoring or regenerating at the time of the interruption,
and means responsive to said loss-of-voltage signal for modifying the operation of the elevator system.

9. The elevator system of claim 8 wherein the time length of the interruption in the three-phase supply which will initiate the loss-of-voltage signal is longer when the direct current motor is motoring, than when it is regenerating.

10. An elevator system, comprising:
an elevator car mounted for up and down travel in a guided path,
motive means including a direct current motor having an armature for driving said elevator car in its guided path,
power supply means for said direct current motor including a three-phase source of alternating potential, and first and second converter banks each having a plurality of controlled rectifier devices connected to interchange electrical power between AC and DC circuits,
control means including gate drive means for activating a selected one of said first and second converter banks,
means providing travel direction signals indicative of the travel direction of the elevator car,
means providing weight signals indicative of the load in the elevator car,
means responsive to said three-phase source of alternating potential for providing a loss-of-voltage signal indicative of an interruption in the three-phase source,
a dynamic braking circuit having resistance means therein,
means responsive to said loss-of-voltage signal for modifying the operation of the elevator system by connecting said dynamic braking circuit across the armature of the direct current motor, and by disconnecting the power supply means from the direct current motor, to decelerate the elevator car to a stop,
and means responsive to said travel direction signals and to said weight signals for selecting a value for the resistance means of said dynamic braking circuit which will decelerate the elevator car to a stop within a narrower range of deceleration limits than would be achievable using resistance means having a fixed value regardless of load and travel direction.

* * * * *